United States Patent [19]

Jou

[11] Patent Number: 5,281,457
[45] Date of Patent: Jan. 25, 1994

[54] REINFORCED GLASS AND PROCESS FOR PRODUCING THE SAME

[76] Inventor: Dih J. Jou, No. 218-3, Jenlin Rd., Wulin Tsun, Jenwu Hsiang, Kaohsiung Hsien, Taiwan

[21] Appl. No.: 861,564

[22] Filed: Apr. 1, 1992

[51] Int. Cl.⁵ ............................................. B32B 17/10
[52] U.S. Cl. ..................................... 428/46; 156/242; 156/245; 156/278; 156/280; 156/307.7; 428/410; 428/417; 428/418; 428/428; 428/430; 428/441
[58] Field of Search ............... 156/242, 245, 278, 280, 156/307.7; 65/60.1, 60.2, 60.3, 60.8; 428/38, 46, 410, 417, 418, 428, 430, 441

[56] References Cited

U.S. PATENT DOCUMENTS

| | | | |
|---|---|---|---|
| 2,780,574 | 2/1957 | Ott et al. | 156/307.7 |
| 3,940,523 | 2/1976 | Lecoeur et al. | 156/278 |
| 4,536,431 | 8/1985 | Wyckoff | 156/278 |

*Primary Examiner*—Caleb Weston
*Attorney, Agent, or Firm*—Woodcock Washburn Kurtz Mackiewicz & Norris

[57] ABSTRACT

Reinforced glass produced by overlaying a coating of thin material on a surface of a plate of glass which is optionally silvered, coating a mixture of silicone and epoxy resin on another surface of the glass, and drying at ambient temperature. A layer of highly-exothermic unsaturated polyester resin is then coated on the surface of the glass and dried. The glass is placed into a mould with the uncoated surface facing downwards. A suitable amount of lowly-exothermic unsaturated polyester resin is poured into the mould. A layer of highly-exothermic unsaturated polyester resin is coated on a surface of a plate of reinforcing material and dried. Before the lowly-exothermic unsaturated polyester resin is completely dried, the reinforcing material is overlaid on the glass with the coated surface of the reinforcing material facing downwards. The resultant assembly is then pressed and dried.

11 Claims, No Drawings

REINFORCED GLASS AND PROCESS FOR PRODUCING THE SAME

BACKGROUND OF THE INVENTION

The present invention relates to reinforced glass having good resistance to impact and heat and relates to a process for producing the same.

Some types of furniture are made of wood either coated with paint or overlaid with a plate of glass. However, the overlaid glass may be easily broken by impact or heat, i.e., its resistance to impact and heat is poor. In addition, without treatment, paints cannot be solidly adhered to glass. Methods to have a desired pattern on glass known to skilled persons include engraving the glass or sandblasting. The designs on the glass created by the above methods are usually unnatural or not vivid.

It is the purpose of this invention, therefore, to mitigate and/or obviate the above-mentioned drawbacks in the manner set forth in the detailed description of the preferred embodiment.

SUMMARY OF THE INVENTION

It is an object of the present invention to provide reinforced glass which has good resistance to impact and heat.

It is another object of the present invention to provide reinforced glass which possesses a natural pattern.

These and additional objects, if not set forth specifically herein, will be readily apparent to those skilled in the art from the detailed description provided hereunder

DETAILED DESCRIPTION OF THE PREFERRED EMBODIMENTS

According to the present invention, a coating of thin material, such as a piece of paper or tin foil, is overlaid on a surface of a plate of glass, which is optionally silvered, at ambient temperature to protect the surface from being contaminated during subsequent steps. A mixture of silicone and polyester resin paint is coated on another surface of the glass, wherein the silicone is used as a medium to solidly adhere the resin paint to the glass.

The mixture is allowed to dry for about four hours and a coating of highly-exothermic unsaturated polyester resin is coated on the mixture to increase the impact strength of the glass. The highly-exothermic unsaturated polyester resin may be optionally blended with a pigment of desired color so that a pattern will be present on the glass.

After drying for about two hours, the glass is placed to a mould with the surface coated with the silicone mixture facing upwards. A suitable amount of lowly-exothermic unsaturated polyester resin is poured into the mould.

A coating of highly-exothermic unsaturated polyester resin is coated on a plate of reinforcing material., such as wood, copper plate, mixture of highly-exothermic unsaturated polyester resin and linestone powder, etc. The reinforcing material has substantially the same surface area as the glass. The reinforcing material is allowed to dry for about one hour and then overlaid on the glass before the lowly-exothermic unsaturated poly-ester resin thereon dries. The resultant assembly is then press to combine the glass and the reinforcing material and to make the lowly-exothermic unsaturated polyester resin spread evenly therebetween, thereby enabling the assembly to spread heat rapidly and evenly. After drying for about four hours, the assembly is released from the mould to obtain reinforced glass.

A preferred example of the highly-exthomeric unsaturated polyester resin is fiberglass reinforced plastics. Barium sulfate powder may be optionally added to the above-mentioned mixture of highly-exothermic unsaturated polyester resin and linestone powder to increase tensile strength of the mixture. For easy release, internal release agent, such as zinc stearate may be optionally added to the mixture.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A process for producing reinforced glass comprising the steps of:

providing a sheet of glass having first and second surfaces;

coating a mixture of silicone and epoxy resin on said first surface;

further coating said first surface with a layer of highly-exothermic unsaturated polyester resin;

providing a plate of reinforcing material having a layer of highly-exothermic unsaturated polyester resin on a surface thereof, said plate having substantially the same surface area as said sheet of glass;

contacting the glass sheet with said plate of reinforcing material through the interposition of a low-exothermic unsaturated polyester resin such that the low-exothermic unsaturated polyester resin is interposed between the layers of high-exothermic material on each of said glass sheet and said plate; and compressing the assembly thus formed.

2. The method of claim 1, wherein said compression takes place in a mould.

3. The method of claim 1, wherein each of the highly-exothermic unsaturated polyester resin layers is dried prior to contact with the low-exothermic resin.

4. The method of claim 2, wherein the contacting step is performed in said mold, the second surface of said glass sheet being protected by a covering of protective material.

5. The method of claim 1, wherein said glass is silvered.

6. The method of claim 1, wherein said highly-exothermic unsaturated polyester resin layer coated on said glass sheet is blended with a pigment.

7. The method claim 1, wherein said reinforcing material is wood.

8. The method of claim 1, wherein said reinforcing material is copper plate.

9. The method of claim 1, wherein said reinforcing material is a mixture of highly-exothermic unsaturated polyester resin and linestone powder.

10. The method of claim 1, wherein said highly-exothermic unsaturated polyester resin is fiberglass reinforced plastic.

11. Reinforced glass produced according to the process as claimed in claim 1.

* * * * *